April 13, 1965     H. SVANOE     3,177,673
PROCESS FOR THE CONVERSION OF SALINE WATER
Filed Jan. 3, 1961
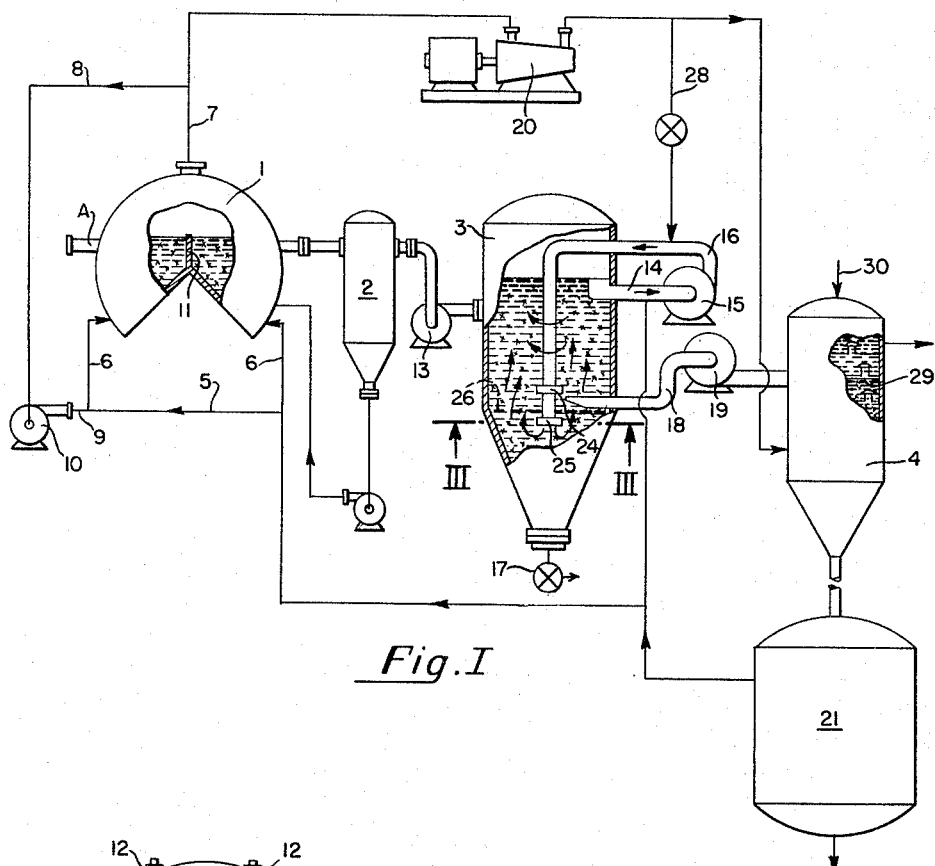
Fig. I
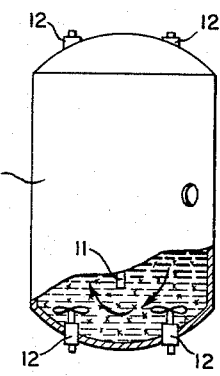
Fig. II
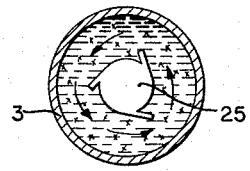
Fig. III
INVENTOR.
HANS SVANOE
BY
ATTORNEY United States Patent Office 3,177,673
Patented Apr. 13, 1965

3,177,673
PROCESS FOR THE CONVERSION OF
SALINE WATER
Hans Svanoe, Warren, Pa., assignor, by mesne assignments, to Struthers Scientific and International Corporation, New York, N.Y., a corporation of Delaware
Filed Jan. 3, 1961, Ser. No. 80,406
8 Claims. (Cl. 62—58)

This invention relates to a process for the conversion of saline water to a practically saline-free water and is more particularly directed to the purification of ice crystals associated with salt-containing mother liquors. This application is in part a continuation of U.S. application S.N. 43,827, filed July 19, 1960.

The treatment of saline water for the preparation of fresh water, i.e., brine-free water is known in the art. A number of processes have been proposed for effecting the treatment. Generally speaking the problem confronting those skilled in this art has not been the mere act of separation, which is well within their skills, for the problem has been to reduce the salt content to a practicable and useable level at a cost that more markets will bear. Because of the present and prospective water shortages throughout the world, processes for conversion to low-cost fresh water are, due to this universal need, under intensive research study. Of the many processes now undergoing study, conversion by freezing has been considered, by many careful investigators, as being, at all odds and thermodynamically at least potentially capable of producing the lowest cost saline-free water. One of the more difficult steps in a freezing process is the separation of the mother liquor from the ice crystals. Avoidance of such contamination and separation of the mother liquor from contaminated ice while at the same time reducing attendant losses of ice produced by melting during the separation operation, etc., has presented a formidable problem. The process of this invention is concerned with a markedly improved method and means of removing the mother liquor that is associated with the ice, while at the same time sharply reducing the losses, in the purification step, occuring in prior art processes.

Objects of the invention include; an improved process for the conversion of saline water to practically saline-free water by freezing; the purification of ice, frozen from saline water, to a reduced salt content having practicable utility; the separation of mother liquor associated with ice crystals produced in the aforesaid processes; the suspension of contaminated ice in a fluid refrigerant and utilizing turbulence and partition ratios to separate the ice from associated brine; an over-all process and means for producing fresh water by an economical series of steps. Other objects and advantages of the invention will hereinafter appear.

The invention will be more readily understood by reference to the drawing which illustrates preferred embodiments of the invention, in which like parts have like numbers throughout.

FIGURES I, II and III illustrate schematically preferred embodiments of the invention.

To begin with saline water from any suitable source, as for example, from the oceans, Owen's Lake, Calif., the Dead Sea, tidal basins, industrial wastes and the like hereinafter referred to as salt water, enters the system of the invention as illustrated by FIGURE I through inlet A. The salt water is subjected to evaporative-crystallization in crystallizer 1, the ice-slurry produced therein passes to a slurry thickener 2 from which the concentrated or thickened slurry passes to the desalinifier 3. After desalinification, the practically salt-free ice crystals are passed to the condenser 4. The saline water in the crystallizer 1 is subjected to the latent heat of evaporation of a refrigerant from header 5 and lines 6 augmented by vapors from the vaporized refrigerant from the crystallizer 1 and carried by lines 7, 8, and 9, the pressure of the vapors from those lines being raised to injection pressure of the liquid refrigerant by the pump 10. Slurry containing ice crystals, mother liquor, and refrigerant in the liquid and vapor phase circulate in the inclosed space around the vertical baffle 11 with the nuclei and ice crystallized therefrom together with refrigerant droplets all of which are uniformly distributed and suspended throughout the inclosed space by propellers 12.

Thickened slurry from vessel 2, that may contain 15% to 50% ice the remainder being brine mother liquor (if a suitable filter or centrifuge is used in place of the thickener 2 the brine content of the thickened ice (or slurry) can be reduced to 10 to 15% by weight or less) is forced by pump 13 into the desalinifier 3. A liquid refrigerant is circulated in desalinifier 3, is withdrawn therefrom by pipe 14 and pump 15 and returned by pipe 16. Purified ice crystals are collected from the top of the suspension plate 26 and transferred by line 18 and pump 19 to the condenser 4. Salt containing mother liquor is discharged from the desalinifier through outlet 17. Condenser 4 is a barometric condenser with any suitable crystal hold up device 29 well known to the art for providing contact of crystals with liquors and vapors. Those shown in the drawing are exemplary and for the purpose of illustration. Compressor 20 which is driven with a suitable variable speed motor draws refrigerant vapors from the crystallization zone 1 adds heat of compression to them and passes them so heated into the condenser 4. By direct contact with the ice crystals introduced into the condenser through line 18, the heat of compression and condensation is utilized to melt the ice. The resulting ice water and liquid refrigerant are collected in decanter 21, the refrigerant as a liquid being returned to the crystallizer 1 and the purified fresh water sent to storage. Fresh water may be introduced into the condenser 4 through line 30 to control temperature and condensation.

An important feature of the process is carried out in the desalinifier 3. In operation, the desalinifier 3 performs several functions. Firstly, it serves as a decanter, with a refrigerant layer extending from the intake leading to pump 15 to below the outlet 25 of the vertical portion of pipe 16, and a brine mother liquor layer extending from the bottom of the refrigerant layer to the outlet 17. Second, it serves as an ice crystal collector, the porous suspension plate 26 maintaining in conjunction with the up flow of refrigerant through the multiplicity of holes in the plate 26 a barrier to the flow of the crystals past the plate 26. And third, it serves to purify the ice crystals. As the crystals enter desalinifier 3 they are picked up in the circulating liquid refrigerant in the desalinifier 3. The refrigerant circulates in two major planes, a vertical and a horizontal plane. The refrigerant is withdrawn from the top of desalinifier 3 by the inlet 14 of pump 15, and returned to an area below the porous plate 26. The refrigerant rises in the desalinifier 3 passes through the perforations in plate 26 and is sucked from the desalinifier 3 by pump 15. This circulation is essentially in a vertical plane. The refrigerant is also ejected from the vertically disposed discharge pipe of line 16 through devices 24 disposed above device 25 disposed below plate 26. The refrigerant is discharge from devices 24 and 25 horizontally and at an angle to the radii of the desalinifier 3 (FIGURE III) giving a centrifugal motion to the contents of vessel 3.

Ice crystals after the major amount of mother liquor brine has been separated by thickening, or any suitable means which may include filtering, centrifuging or the like, hold absorbed on their surfaces certain amounts of that brine. For many important uses this retained brine should be removed and it is removed expeditiously in the desalinifier 3 and by the circulating action of the liquid refrigerant. The vertical movement of the refrigerant suspends the ice crystals during treatment; the horizontal movement of the refrigerant sets up a centrifugal movement of the contents of the desalinifier 3 which spins the heavier liquids present to the walls of that vessel. The suspended crystals are freed from adhering mother liquor brine, the latter is centrifuged to the vessel walls and being heavier than the refrigerant flows down the walls and is discharged from the outlet 17. The purified ice passes from the desalinifier 3 to the condenser 4.

More specifically the process of the invention is operated by passing sea water containing 34,000 p.p.m. of salt, and precooled to a temperature of about 0° C., into the evaporator-crystallizer 1 at a rate of 100 gallons per minute. Liquid butene, under a hydraulic head of sea water of 15", is injected into the crystallizer through nozzles that deliver the butene as droplets having an average drop diameter between 0.1 mm. and 1.5 mm. The temperature of the sea water is maintained by the flow of butene at about minus 3° C. The resulting slurry is passed to slurry thickener 2 the mother liquor decanting from the thickener return to the crystallizer 1. Pump 13 passes the thickened slurry into the desalinifier 3 wherein it meets the refrigerant under an absolute pressure of above 300 mm. of Hg at a temperature of about minus 3° C. Hold up time in the desalinifier is about 15 minutes although it can be varied widely to from 5 to 20 minutes or more in accordance with the salinity reduction desired.

Any refrigerant having a specific gravity broadly below 1.00, and preferably below 0.9 at 20° C. a suitably high latent heat of evaporation in crystallizing ice from sea water under the temperature and pressure of the process of the invention may be used. The preferred refrigerants are liquids, at absolute pressures above 300 mm. of Hg at the temperature of crystallization in crystallizer 1, that are relatively insoluble in water at around 0° C., i.e., a solubility of less than about 0.5 gr./100 grs. of water. Examples of suitable refrigerants for this purpose are alkyl halides, e.g., ethyl chloride, butyl chloride, and the other low specific gravity, relatively low boiling hydrocarbon halides. The low boiling saturated and unsaturated hydrocarbons such as normal and iso-propane, normal and iso-butane, the normal and iso butenes and equivalent readily liquifiable hydrocarbons are preferred.

The refrigerant as it is introduced into the crystallizer 1 and/or the desalinifier 3 may contain an adjuvant to control the specific gravity of the average environments of these vessels and/or rate of evaporation of the refrigerant. In both vessels the ice crystals are held in turbulent suspension which requires an adjustment of the specific gravity of the environment. In the crystallizer 1 as the environment is principally sea water the adjuvant may be, for example, refrigerant vapors from line 8 giving an environment with an average or apparent specific gravity (density) of the ice crystals formed. In the desalinifier 3 as the environment is principally refrigerant, refrigerant vapors may be used as the adjuvant introduced through line 28, in comparison with the amount added to crystallizer 1, the vapors are added in reduced amounts. Mixtures of refrigerants, preferably compatible, may be used in any desired ratio the chlorinated and florinated hydrocarbons, e.g., the multi-chlorinated and florinated ethylenes diflorodichloroethane etc with their high specific gravities being used with the olefines and other low specific gravity refrigerants in proportions such that the desired environmental average density of the crystallizer 1 and the desalinifier 3 are provided. With the use of isobutene as the refrigerant for the crystallization in vessel 1 and especially for the washing of ice crystals in desalinifier 3 or in like environments in which the mother liquor is separated from the ice crystals in a dispersion having a specific gravity of less than about 0.9 at 0° C., the production of ice crystals having a low p.p.m. of salt is assured.

The process and apparatus described may be modified in many ways within the purview of the invention as hereinafter claimed without departing from the invention, or without operating outside the scope of the claims.

I claim:

1. In a process in which saline water is converted to practically saline-free water through crystallization induced by the latent heat effect of and direct contact with an evaporating liquid organic refrigerant, the steps which comprise crystallizing discrete ice crystals from saline water by freezing fresh water ice from the saline water by the latent heat of evaporation of a liquid organic refrigerant in an environment maintained at a temperature of less than 1° C. below the freezing point of the saline water, thickening the resulting slurry, suspending the thickened slurry in a circulating liquid organic refrigerant that is kept in the liquid phase by a temperature below 0° C. and an absolute pressure of above 300 mm. of Hg, subjecting the suspended slurry to centrifugal treatment, whereby the ice crystals pass to the central and the mother liquor passes to the outer part of the treated slurry, separating the mother liquor from the outer part and the ice crystals from the central part of the treated slurry, and using the same organic refrigerant in the freezing and suspending steps.

2. The process of claim 3 in which the thickened slurry is suspended in a circulating refrigerant that has a specific gravity less than about 0.90 at 0° C.

3. In a process in which saline water is converted to practically saline-free water through crystallization induced by the latent heat effect of and direct contact with an evaporating liquid organic refrigerant, the steps which comprise crystallizing discrete ice crystals from saline water by freezing fresh water ice from the saline water by the latent heat of evaporation of a liquid organic refrigerant in any environment maintained at a temperature of less than 1° C. below the freezing point of the saline water, thickening the resulting slurry, suspending the thickened slurry in a liquid organic refrigerant, maintaining the refrigerant in the liquid phase by a temperature below 0° C. and an absolute pressure above 300 mm. of mercury, maintaining the specific gravity of the suspension environment below the specific gravity of the ice crystals, subjecting the suspended slurry to centrifugal treatment, whereby the ice crystals pass to the central and the mother liquor passes to the outer part of the treated slurry, separating the mother liquor from the outer part and the ice crystals from the central part of the treated slurry, and using the same organic refrigerant in the freezing and suspending steps.

4. In a process in which saline water is converted to practically saline-free water through crystallization induced by the latent heat effect of and direct contact with an evaporating liquid organic refrigerant, the steps which comprise crystallizing discrete ice crystals from saline water by freezing fresh water ice from the saline water by the latent heat of evaporation of a liquid organic refrigerant in an environment maintained at a temperature of less than 1° C. below the freezing point of the saline water, thickening the resulting slurry, suspending the thickened slurry in a liquid organic refrigerant, that is kept in the liquid phase by a temperature below 0° C. and an absolute pressure above 300 mm. of mercury, circulating in vertical and horizontal planes in the zone of suspension, subjecting the suspended slurry to centrifugal treatment, whereby the ice crystals pass to the central and the mother liquor passes to the outer part of the treated slurry, separating the mother liquor from the outer part and the ice crystals from the central part of the treated slurry, and using the same organic refrigerant in the freezing and suspending steps.

5. The process of claim 4 in which the refrigerant is a butene.

6. The process of claim 4 in which the thickened slurry is suspended in a refrigerant containing an adjuvant.

7. In a process in which saline water is converted to practically saline-free water through crystallization induced by the latent heat effect of and direct contact with an evaporating liquid organic refrigerant, the steps which comprise crystallizing discrete ice crystals from saline water by freezing fresh water ice from saline water by the latent heat of evaporation of a liquid organic refrigerant in a constant environment maintained at a uniform temperature of about minus 3° C., thickening the resulting slurry, suspending the thickened slurry in a vertically and horizontally and centrifugally circulating organic refrigerant, whereby the ice crystals pass to the central and the mother liquor passes to the outer part of the treated slurry, separating the mother liquor from the outer part and the ice crystals from the central part of the treated slurry, and using the same organic refrigerant in the freezing and suspending steps.

8. The process of claim 7 in which the refrigerant is a butene and the environment in which the brine is separated from the ice crystals has a specific gravity of less than about 0.9 at 0° C.

References Cited by the Examiner

UNITED STATES PATENTS

| | | | |
|---|---|---|---|
| 981,098 | 1/11 | McCaskell | 259—95 X |
| 1,135,080 | 4/15 | Vandercook | 210—194 |
| 2,683,178 | 7/54 | Findlay. | |
| 2,692,798 | 10/54 | Hicks | 259—95 X |
| 2,821,304 | 1/58 | Zarchin | 62—123 X |
| 2,904,511 | 9/59 | Donath. | |
| 2,997,856 | 8/61 | Pike | 62—58 |

FOREIGN PATENTS

| | | |
|---|---|---|
| 70,507 | 6/46 | Norway. |
| 217,766 | 10/58 | Australia. |

OTHER REFERENCES

Gilliland, "Fresh Water for the Future," Industrial and Engineering Chemistry, vol. 47, number 12, December 1955, pages 2410–2422.

NORMAN YUDKOFF, *Primary Examiner.*

ROBERT A. O'LEARY, GEORGE D. MITCHELL, *Examiners.*